3,148,017
TREATMENT AND COLORING OF PREFORMED
POLYOLEFIN MATERIALS
Domenick Donald Gagliardi, 5454 Post Road,
East Greenwich, R.I.
No Drawing. Filed July 14, 1961, Ser. No. 123,988
13 Claims. (Cl. 8—4)

This invention relates to the treatment and coloring of preformed polyolefin materials. More particularly, it concerns the treatment of fibers, yarns, fabrics, films, and other shaped solid articles of polyolefin material so that the articles will have surfaces which are receptive to water-soluble cationic dyestuffs.

It is well known that organic and inorganic dyes and pigments, whether applied from water dispersions, from solvent solutions, as print pastes and the like, do not adhere well to polyolefin substrates. It is extremely difficult to print on, or to color such substrates, and various expedients have been suggested and tried for overcoming this difficulty, e.g., see "Chemical Week," January 7, 1961, pages 43–44.

A principal object of this invention is the provision of new processes of coloring and ornamenting polyolefin materials. Further objects include:

(1) The provision of new processes which make it possible for water-soluble cationic dyes to be firmly affixed in and on fibers, films, sheets, rods and other preformed articles of solid polyolefins.

(2) The provision of preformed articles of solid polyolefins colored with water-soluble basic dyes in which the dyes are so firmly affixed in or to the polymer substrates that the color strongly resists removal by rubbing, solvents, water extractions or the like.

(3) The provision of new processes for coloring preformed articles of solid polyolefins which can be conducted with equipment generally available using known material handling techniques and commercially available, water-soluble basic dyestuffs.

(4) The provision of new methods of adhering water-soluble basic dyes to the surfaces of shaped solid polyolefins.

(5) The provision of fibers, films, sheets, rods and other preformed articles of solid polyolefins which are capable of being dyed in permanent, level, washfast and deep shades with water-soluble, cationic textile dyes.

(6) The provision of new forms of preformed articles of polyolefins colored with cationic textile dyes.

(7) The provision of new surface treatments for polyolefin fibers and films to make the surfaces more receptive to water-soluble basic textile dyes.

Other objects and further scope of applicability of the present invention will become apparent from the detailed description given hereinafter; it should be understood, however, that the detailed description and specific examples indicate preferred embodiments of the invention, but are given by way of illustration only, since various changes and modifications within the spirit and scope of the invention will become apparent to those skilled in the art from this detailed description.

These objects are accomplished according to the present invention through the treatment of preformed articles of solid polyolefins with a sulfo-organic compound having a molecular weight between about 140 and 1000. After the application of the sulfo-organic compound to the surface of the polyolefin article, it is allowed to remain in contact with the surface for a time sufficient under the imposed conditions to permit at least some of it to imbue the polyolefin substrate so that it will produce dyeability with cationic dyes. Finally, any excess of the sulfo-organic material is removed, leaving the polyolefin receptive to basic textile dyes, but otherwise, unchanged in appearance or other characteristics.

The sulfo-organic compound may be applied to the polyolefin article as a solution in an organic solvent, as an aqueous dispersion or emulsion or in the vapor, liquid or molten form. The application can be carried out by impregnating, spraying, coating, infusing or in any other suitable fashion. Following application of the sulfo-organic compound, the article and the applied compound are preferably heated to an elevated temperature below the melting point of the polyolefin.

The sulfo-organic compounds useable with the invention should have a molecular weight between about 140 and 1000 and preferably between about 200 and 800. The compound must contain a —SO₃H group which may appear in the free acid form or as a partial salt thereof. The sulfo-organic compound must also contain a non-polar hydrocarbon group containing at least two carbon atoms and preferably between about 10 and 20 carbon atoms.

A preferred group of organic sulfo-compounds for use in carrying out the new processes of this invention are those having the formula:

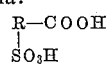

wherein R is an alkyl, aralkyl, aryl or cycloalkyl radical containing at least one carbon atom, typically (1–18) carbon atoms.

Typical sulfocarboxylic acids which perform in this process are:

| | |
|---|---|
| α-Sulfostearic acid | 5-sulfo-1-hydroxy-2- |
| α-Sulfopalmitic acid | naphthoic acid |
| α-Sulfolauric acid | 5-sulfo naphthalic acid |
| 3-sulfocaproic acid | 2-sulfo-3-phenyl propionic |
| 6-sulfohexoic acid | acid |
| 3-sulfobenzoic acid | 2-sulfo hexahydrobenzoic |
| 3-sulfophthalic acid | acid |
| 4-sulfophthalic acid | 4-sulfo hexahydrosalicylic |
| 4-sulfosalicylic acid | acid |
| α-Sulfoacetic acid | 2,12-disulfostearic acid |
| 5-sulfo-2-naphthoic acid | α-Cyclohexyl-α-sulfo acetic |
| 1-sulfo-2-naphthoic acid | acid |

A two-step procedure of carrying out the new processes involves treatment first with the sulfo-organic compound, followed by application of the basic water-soluble dye using conventional systems or techniques of dyeing or printing.

In the case of textile materials, the treated fabric can be colored by padding through a bath of a basic dyestuff, followed by drying the material. Alternatively, the treated textile material may be printed with dye printing systems utilizing conventional techniques. As in all textile dyeing and printing processes, the conventional coloring aids such as wetting agent, leveling agents, thickening agents, anti-crocking agents, crosslinking agents, water repellents, oil repellents, and the like may be employed in the process.

In the case of films and other non-fibrous solid polyolefins, the material may be pretreated as above and then be printed and colored by basic dyes or printing inks formed with such dyes.

A preferred operation of the invention as applied to fibers or fabrics formed of polyolefins involves:

(a) Wetting the polyolefin fibrous material with a fluid comprising the sulfo-organic compound;

(b) Drying the wet fibrous material;

(c) Heating the dried fibrous material to a temperature from about 100° F. to about 10° F. below the fusion temperature of the fibers for between about 1 and 120 minutes to imbue at least the surface portions of the fibers with the sulfo-organic compound;

(d) Scouring the resulting fibrous material to remove any excess of the sulfo-organic compound not imbued in the fibers; and (e) Finally, dyeing such treated fibrous material to level deep shades with a water-soluble, cationic textile dye.

The sulfo-treating compound may be applied to the polyolefin material by spraying, impregnation or coating from water dispersions, from solvent solution, from solubilizing systems using salts of the free acid, and by vapor phase treatments.

In order to insure proper application of the treating compound in the polyolefin fibers, it is preferred to age the treated material after contact with the sulfo-organic compound. The aging may be accomplished by 1–12 hours' storage at room temperature, or at elevated temperatures of 100–250° F. for periods of 1 to 120 minutes, preferably 200–250° F. from 1–15 minutes, depending on the weight of the textile item being treated, or by flash diffusion under pressure or in the presence of supersaturated steam. Temperature ranges from 100° F. to near the softening point, but at least 10° F. below the melting point of the polyolefin are useful. Shorter times and higher temperatures may be used in "flash" drying equipment as long as the fiber melting temperature is not exceeded. Boiling from suitable solvent solutions of the compounds may also be useful.

There are only general limits to the concentration of compound needed for the treatments prescribed. For example, in a padding method of applying the compound from aqueous, alcoholic or solvent solutions of about 0.1 to 10% concentration, good coloration of the polyolefin fibers may be obtained within the limits of from 0.01–10% deposited compound. Deposition of 0.1 to 5.0% and, typically 0.5 to 2%, of the sulfo-organic compound is generally sufficient to obtain good coloration. If only light shades are desired, then the lower concentrations of compound are most economical to use. In general, the amount deposited is determined by the depth of share required for a particular type of basic dye. It is recommended that the amount of sulfo compound imbued in the polyolefin be within the limits of 0.01 to 10% by weight of the polyolefin.

It is preferred to scour the treated material prior to dyeing in order to remove unreacted sulfocarboxylic acid, wetting agents, or other treating assistants. The dyeing of the treated polyolefin textile material is then carried out with basic or cationic dyes in conventional manners common to the art of dyeing textiles in machines such as the jig, beck, pad-steam range, and pressure dyeing equipment. The conventional dyeing assistants such as leveling agents, wetting agents, alkali salts, dyefixing agents, copper salts, chromium salts, etc. may be used in the process to produce uniform dyeing and to improve lightfastness, washfastness and crockfastness as desired.

The treatment of the polyolefin material may also be done on the fibers immediately after spinning. The fibers may then be twisted into yarns and then woven into fabrics. After which, they can be dyed with the cationic or basic dyes.

For special applications, the sulfocarboxylic acid may be applied simultaneously with the spinning or extruding into fibers, films or rods. Again 0.1 to 5.0 is satisfactory to produce various shades of dyeing at a later stage.

In the case of blended fabrics wherein the polypropylene or polyethylene is woven in admixture with polyester fibers, nylon fibers, silk fibers, etc., it may be preferred to treat the polyolefin material prior to twisting and weaving. Then the final assembly may be dyed with basic or cationic dyes.

The preferred pH range for applying the sulfocarboxylic acids is pH 1.0–3.0, where maximum dye yield is obtained. Other pH's below 7.0 may be used to reduce the rate or degree of dyeing when desired. The pH adjustments of the treating bath may be made by the addition of small amounts of ammonia, amines, alkali hydroxides, or buffering agents.

The invention is of particular importance for the coloring of fibers and other preformed articles made of solid polymers of olefins having 2–4 carbon atoms, although the new treatments appear to be applicable to all fiber-forming and comparable solid polyolefins. The invention especially concerns polymers of the class that have an inherent viscosity of at least 0.8 and particularly those having an inherent viscosity between about 1.2 and about 10. The term "inherent viscosity" as used herein, means the viscosity of a solution of 0.2 gram of the polymer in 50 cc. of tetralin at 130° C.

Fiber-forming polyethylene and polypropylene are important polyolefins which may be treated by the new operation. These polymers and their various methods of preparation are extensively described in the literature. In addition to these homopolymers of 2–4 carbon atom olefins, copolymers of olefins with other unsaturated hydrocarbons may be satisfactorily treated with the new procedures.

The new treatments make possible the coloration of the treated polyolefin with water-soluble, cationic dyestuffs which normally do not adhere well to polyolefin surfaces. The cationic dyes which are suitable for the dyeing of polyolefins in this invention are characterized by having a positive or cationic charge in solution:

$$Dye^+ \, A^-$$

where $Dye^+$ is the chromophoric part of the molecule and $A^-$ is an anion such as chloride, acetate, methosulfate, or sulfonate in free form or in the form of a zwitter ion. There are a large number of dyestuffs in which the color portion of the molecule is a cation or a base. These are described in the "Colour Index" (C.I.), volume I, pages 1617–1654, and in volume III under the appropriate subclasses of cationic or basic constitutions. Typical examples are:

Malachite Green: C.I. No. 42000
Basic Yellow 3: C.I. No. 41005
Regina Purple: C.I. No. 42515

Technical data and other specific information concerning actual operations in accordance with the invention are given below in which all parts or percentages are by weight unless otherwise specified.

*Example I*

Swatches of polypropylene fabrics were padded through aqueous solutions containing the following compositions:

(A) Water only
(B) 1% sulfostearic acid
(C) 2% sulfostearic acid
(D) 3% sulfostearic acid
(E) 4% sulfostearic acid
(F) 5% sulfostearic acid After padding to give about 100% pick-up, the impregnated swatches were air dried for one hour at room temperature and then were heated for ten minutes at 250° F. Then, they were all scoured with 0.1% of a non-ionic detergent and 0.25% sodium carbonate solution, followed by three water rinses, and air dried. All swatches were dyed with five different cationic dyes in a dye bath which contained 1% dye based on weight of the fabric and a bath fabric ratio of 30:1. The swatches were immersed in the dye bath at room temperature. The temperature was raised to 200° F. in one hour. Dyeing was continued for one hour at 200° F. After dyeing, all swatches were scoured in a solution containing 0.1% of a non-ionic detergent and 0.25% of sodium carbonate at 140° F., followed by rinsing and drying. The following cationic dyes were used in this experiment:

| | |
|---|---|
| Victoria Green WB | C.I. No. 42000 |
| Basic Green | C.I. No. 42040 |
| Basic Red 9 | C.I. No. 42500 |
| Basic Blue | C.I. No. 51180 |
| Calcozine Red | C.I. No. 50240 |

In examining the dyed swatches, it was observed that the untreated polypropylene fabric was only very slightly surface stained by any of the dyes. All of the sulfostearic acid treated swatches were dyed by all five dyes. The depth of shade increased with increasing concentration of the sulfostearic acid which had been applied.

*Example II*

Four swatches of polypropylene fabric were padded separately through three aqueous solutions containing 5%

(A) Sulfostearic acid
(B) Sulfopalmitic acid
(C) Sulfolauric acid

After padding, the swatches were heated as follows:
(1) Dried 15 minutes at 200° F. and then cured 5 minutes at 250° F.
(2) Sealed wet in a plastic film and then heated for 2 hours at 200° F.
(3) Treated as in No. 2 above and then heated for 5 minutes at 250° F.
(4) Sealed wet in a plastic film and allowed to age 24 hours, followed by heating 5 minutes at 250° F.

After the above treating cycles, all swatches were scoured with a solution containing 0.1% of a non-ionic detergent and 0.25% sodium carbonate at 140° F., followed by rinsing and drying. The swatches were then dyed with 1% cationic dye, Victoria Green, by the procedure of Example I. An untreated piece of polypropylene fabric was also dyed. In examining the swatches, it was noted that all of the swatches treated with the sulfocarboxylic acids were dyed. Only light surface staining was noted on the swatch of untreated polypropylene. With all three acid treatments, the deepest shade was produced by the heat treatment No. 1 above. Treatments No. 3 and 4 produced slightly lighter shade than No. 1, but still very deep coloration of the fibers. Medium depth of shade was found by the No. 2 procedure. Swatches of the polypropylene which had been treated with the three acids by procedure No. 1 were subjected to a 30 minute wash at 160° F. with 0.5% soap and 0.5% sodium carbonate. Another set was dry cleaned three times in perchloroethylene. Very little or no color loss was found in any of the samples, indicating the permanency of the color in the polypropylene. The slight surface stain present on the untreated polypropylene was completely removed in the wash and dry clean tests.

*Example III*

A swatch of a polyethylene monofilament fabric was treated with an aqueous solution containing:

5% sulfostearic acid
½% polyethylene oxide leveling agent

The impregnated fabric was air dried for one hour and then heated for 10 minutes at 225° F. It was then scoured with 0.1% non-ionic detergent at 140° F., rinsed, and placed in a dye bath containing 1% Malachite Green (C.I. No. 42000). The dyeing was carried out as in Example I. A piece of the untreated polyethylene fabric was also lyed by the same procedure. Very slight staining was found on the untreated polyethylene filaments. The sulfostearic acid treated sample was a dark green color, which was not removed by washing. No crocking or rub-off of the color was noted in the sulfostearic acid treated sample.

*Example IV*

Swatches of polypropylene fabric treated with the sulfocarboxylic acids as in Example II were dyed with three other cationic dyes by the procedure of Example I. The dyes used were:

| | |
|---|---|
| Hidaco Caribbean Blue | C.I. No. 42140 |
| Hidaco Basic Blue 10G | C.I. No. 42025 |
| Hidaco Crystal Violet | C.I. No. 42555 |

Control swatches of untreated polypropylene fabric were dyed in the same dyebaths. All three dyes produced excellent deep and level dyeing of the sulfocarboxylic acid treated polypropylene. Only light staining was found with any of the dyes on the untreated polypropylene.

*Example V*

Swatches of polypropylene fabric treated with 5% sulfostearic acid as in Example I were also treated with various scouring solutions prior to dyeing with 1% Victoria Green cationic dye. After padding, drying and heating, the swatches were treated as follows:

(A) Scoured in 0.1% non-ionic detergent
(B) Scoured in presence of 1% copper acetate
(C) Scoured in presence of 1% chromium acetate
(D) Scoured in presence of 0.25% sodium carbonate After the scouring, the swatches were dyed as in Example I. The various metal salt treatments prior to dyeing generally produced deeper shade and better leveling of the green dye.

The samples scoured as in (A) above, after dyeing, were treated with three different dyefixing agents:

(A) 3% stearatochromic chloride
(B) 3% polyamine-copper chloride adduct
(C) 3% zinc acetate The treatments were done by padding followed by drying 5 minutes at 250° F. Excellent color value and washfastness was obtained by the above dyeing and aftertreating procedures.

*Example VI*

Samples of polyethylene films were soaked in alcoholic solutions of sulfosalicylic acid. They were drained and then heated at 200° F. for 15 minutes. After heating, the samples were dyed with 1% Genacryl Yellow (C.I. No. 41000) as in Example I. Untreated pieces of polyethylene films were dyed in the same bath. Only the sulfosalicylic acid treated specimens were colored by this procedure. No dyeing was found on the untreated polyethylene.

*Example VII*

Samples of polypropylene yarns were treated by padding with aqueous solutions of sulfolauric acid whose pH had been adjusted by ammonium hydroxide to the following levels:

(A) pH 1.5
(B) pH 3.0
(C) pH 5.0
(D) pH 7.0
(E) pH 9.0

After padding, the samples were dried at 15 minutes at 200° F. and then were cured 5 minutes at 250° F. They were scoured as in Example I and then dyed with 1% Victoria Green cationic dye. Deepest dyeing was obtained in the samples which had been treated at pH of 1.5. Increasing the bath pH produced lighter shades, but still better dyeing than was found in the piece of untreated polypropylene.

*Example VIII*

A solid filament of polyethylene was treated with a 0.5% alcoholic solution of sulfophthalic acid by immersion for 1 hour. The wetted filament was removed from the solution and flash dried for 1 minute at 300° F. Without scouring, the filament and an untreated control were dyed with a 3% solution of the basic dye, Basic Orange (C.I. No. 11270). The dyeing process was as in Example I. No color was found in the untreated filament. A bright orange color was produced in the sulfophthalic acid treated specimen.

*Example IX*

Samples of polyethylene and polypropylene fabrics were treated with 3% aqueous solutions of sulfoacetic acid which had been prepared by the reaction of 100% sulfuric acid with glycolic acid. After drying for 30 minutes at 200° F., the specimens were rinsed and then dyed with 1% of the basic dye, Maxilon Yellow (C.I. No. 41000). Both samples were deeply colored. The color remained on washing and dry cleaning.

The new treatments made possible the coloration of the treated polyolefin with water-soluble cationic dyestuffs which normally do not adhere well to polyolefin surfaces. The specified sulfo-organic materials may be used as the sole binding agents for the cationic dyes or they may be used in conjunction with conventional adhesives in obtaining adhesion to the polyolefin. The binding of water-soluble cationic dyes to polyolefin fiber and films has utility in the use of printing inks, labeling and production of decorative effects.

In addition to the improvements in dyeing of polyolefins which can be attained by the new treatment operations, they are also effective in other ways, e.g., rendering the polyolefin surfaces less electrostatic, more receptive to laminating adhesive, more receptive to pigments, paints and other coating compositions, more receptive to fluid-repellent agents and the like.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A process for coloring a fabric formed of fibers composed of solid polymer of an α-alkylene containing 2 to 4 carbon atoms having an inherent viscosity of at least 0.8 which comprises:
   (a) contacting the fibers of the fabric with a sulfocarboxylic acid having a molecular weight between about 200 and 800,
   (b) heating said fibers while in contact with said sulfocarboxylic acid to a temperature between about 100° F. and 10° F. below the melting point of the polyolefin for between about 1 and 120 minutes,
   (c) removing sulfocarboxylic acid compound from said fibers, and
   (d) dyeing said fabric with a water-soluble cationic textile dye.

2. A process of ornamenting films of a solid polymer of an α-alkylene containing 2 to 4 carbon atoms having an inherent viscosity of at least 0.8 which comprises applying an aqueous solution of α-sulfo stearic acid to a surface of a film of said solid polymer, drying the film to evaporate the water and leave as residue said sulfostearic acid, the application of said solution being controlled to provide a residue of about 1 to 5% by weight of the acid based upon the weight of the film, then heating the treated film to a temperature of about 100° to 250° F. for about 5 to 30 minutes, dyeing the treated surface of the film with a coloring composition containing a water-soluble cationic textile dye and then drying the dyed film.

3. A process of decorating fabric formed of polyolefin fibers which comprises padding a fabric formed of fibers of a solid polymer of an α-alkylene containing 2 to 4 carbon atoms having an inherent viscosity of at least 0.8 through an aqueous composition containing about .5 to 10% by weight of a 1 to 18 carbon atoms alkyl α-sulfo monocarboxylic acid, the padding being preformed to give a wet pick-up of between about 50 and 100%, drying the fabric, heating the dried fabric about 5 to 30 minutes to a temperature of about 200 to 250° F., then dyeing the resulting fabric in an aqueous dye bath containing about 1 to 10% by weight of a water-soluble cationic textile dye.

4. A process for coloring preformed articles composed of solid polymer of an olefin containing 2 to 4 carbon atoms of the formula:

$$CH_2=CHR$$

wherein R is selected from the group consisting of hydrogen and alkyl, said solid polymer having an inherent viscosity of at least about 0.8 and being non-receptive to water-soluble dyes in the absence of treatment according to said process which comprises:
   (a) applying to the surface of the article to be colored a sulfo-organic compound having a molecular weight between about 140 and 1000 of the formula:

$$\begin{array}{c} R-COOH \\ | \\ SO_3H \end{array}$$

wherein R is an alkylene radical containing between 1 and 18 carbon atoms,
   (b) heating the article and the applied sulfo-organic compound to an elevated temperature between about 100° F. and 10° F. below the melting point of the polyolefin material for between about 1 and 120 minutes, and
   (c) dyeing said article with a water-soluble cationic textile dye.

5. A process as claimed in claim 4 wherein said article is a film of said solid polymer.

6. A process as claimed in claim 4 wherein said article is a fabric woven of fibers of said solid polymer.

7. A process as claimed in claim 4 wherein the sulfogroup of the sulfo-organic compound is in a position alpha to the carboxylic group.

8. A process as claimed in claim 4 where said sulfoorganic compound is applied as a solution in an organic solvent.

9. A process as claimed in claim 4 where said sulfo compound is an α-sulfo alkyl monocarboxylic acid in which the alkyl radical contains between 1 and 18 carbon atoms.

10. A process as claimed in claim 4 where said sulfocompound is applied to said article in a separate step preceding the said dyeing step and the article is heated after said compound application and before said dyeing step to a temperature between about 100° F. and 250° F.

11. A preformed article composed of solid polymer of a 2 to 4 carbon atom α-alkylene capable of being dyed in deep shades with water-soluble cationic textile dyes having at least some portions thereof imbued with a sulfo-carboxylic acid having a molecular weight between about 140 and 1000 containing a hydrocarbon group.

12. A preformed article composed of solid polymer of a 2 to 4 carbon atom α-alkylene capable of being dyed in deep shades with water-soluble cationic textile dyes having at least some portions thereof imbued with about 0.1 to 5% by weight of a sulfo carboxylic acid containing between about 1 to 18 carbon atoms.

13. Fibers composed of solid polymer of a 2 to 4 carbon atom α-alkylene capable of being dyed in deep shades with water-soluble cationic textile dyes which comprise between about 0.1 to 5% by weight based upon the total weight of said fibers of a sulfocarboxylic acid having a molecular weight between about 200 and 800, said acid not forming a part of the molecules of said solid polymer.

References Cited in the file of this patent

UNITED STATES PATENTS

| | | |
|---|---|---|
| 1,951,712 | Schoeller | Mar. 20, 1934 |
| 2,524,811 | Koberlein | Oct. 10, 1950 |
| 2,663,612 | Gibson | Dec. 22, 1953 |
| 2,864,816 | Nicolaus | Dec. 16, 1958 |
| 2,984,634 | Caldwell | May 16, 1961 |
| 3,069,220 | Dawson | Dec. 18, 1962 |
| 3,073,667 | Bonvincini | Jan. 15, 1963 |

OTHER REFERENCES

British Plastics, pages 190–194, April, 1950.

Diserens: Chemical Technology of Dyeing and Printing, vol. 2, 1951, pages 96–98, 101–102 and 283, TP 983 D 49PE. Pub. by Reinhold Pub. Corp., New York, NY.

Finch: Fibers and Plastics, 1960, pp. 14–16, 8-vinyon.